United States Patent
Sawai et al.

(10) Patent No.: US 6,331,879 B1
(45) Date of Patent: *Dec. 18, 2001

(54) LIQUID CRYSTAL PROJECTOR WITH AN ILLUMINATION OPTICAL SYSTEM

(75) Inventors: Yasumasa Sawai; Takashi Ohta, both of Sakai; Nobuo Mushiake, Minamikawachi-Gun; Hideki Nagata, Sakai; Soh Ohzawa, Toyonaka, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/749,887

(22) Filed: Nov. 18, 1996

(30) Foreign Application Priority Data

Nov. 20, 1995 (JP) ................................. 7-300922
Nov. 20, 1995 (JP) ................................. 7-300923
Nov. 20, 1995 (JP) ................................. 7-300924

(51) Int. Cl.[7] ................. G02F 1/1335; G03B 21/00; G02B 27/14
(52) U.S. Cl. ................. 349/9; 349/95; 353/31; 359/630
(58) Field of Search ............... 349/8, 9, 95; 359/622, 359/487; 355/31, 30

(56) References Cited

U.S. PATENT DOCUMENTS

| 5,052,783 | * | 10/1991 | Hamada | 349/5 |
| 5,237,435 | * | 8/1993 | Kurematsu et al. | 349/9 |
| 5,300,942 | | 4/1994 | Dolgoff | 345/32 |
| 5,381,278 | * | 1/1995 | Shingaki et al. | 349/9 |
| 5,387,953 | * | 2/1995 | Minoura et al. | 349/9 |
| 5,550,656 | * | 8/1996 | Sprague et al. | 349/95 |
| 5,712,694 | * | 1/1998 | Taira et al. | 349/9 |
| 5,726,719 | * | 3/1998 | Tanaka et al. | 349/8 |
| 5,729,306 | * | 3/1998 | Miayake et al. | 349/9 |
| 5,808,800 | * | 9/1998 | Handschy et al. | 359/630 |
| 5,856,479 | * | 12/1998 | Ueda et al. | 349/9 |
| 5,898,521 | * | 4/1999 | Okada | 359/487 |

FOREIGN PATENT DOCUMENTS

| 6-110079 | * | 4/1994 | (JP) . |
| 6-265887 | | 9/1994 | (JP) . |
| 7-120753 | | 5/1995 | (JP) . |

* cited by examiner

Primary Examiner—Toan Ton
(74) Attorney, Agent, or Firm—Burns, Doane, Swecker & Mathis, LLP

(57) ABSTRACT

A liquid crystal projector includes an illumination optical system provided with a light source, first and second lens arrays arranged in this order from the light source, a liquid crystal panel, and a polarization changing optical system arranged between the first and second lens arrays. This makes it possible to install the polarization changing optical system and the optical integrator in a smaller space.

29 Claims, 9 Drawing Sheets

LIQUID CRYSTAL PROJECTOR WITH AN ILLUMINATION OPTICAL SYSTEM

BACKGROUND OF THE INVENTION

This invention relates to a liquid crystal projector provided with an illumination, optical system including a polarization changing optical system and an optical integrator.

In the conventional field of liquid crystal projectors, there has been known a liquid crystal projector provided with an illumination optical system including a polarization changing optical system and an optical integrator to obtain a bright projected image having a uniform distribution of illuminance as disclosed in Japanese Unexamined Patent Publications Nos. (HEI)6-265887 and (HEI)7-120753.

However, the above liquid crystal projector has a problem that the polarization changing optical system is likely to be degraded by heat because of its position in proximity to a light source.

Further, in the above liquid crystal projector, a polarization change is completed in a position more toward the light source than where the beam is incident on the optical integrator, the dimension of the illumination optical system in a direction normal to its main optical axis disadvantageously increases. Furthermore, since spaces are required to install the polarization changing optical system and the optical integrator, respectively, the dimension of the illumination optical system in a direction along its main optical axis disadvantageously increases. There are also problems that the polarization changing optical system making effective use of the light from the light source has a large size and a complicated construction.

SUMMARY OF THE INVENTION

It is an object of the present invention to provide a liquid crystal projector provided with an illumination optical system which has overcome the problems residing in the prior art.

It is another object of the present invention to provide a liquid crystal projector provided with an illumination optical system which is compact despite the use of a polarization changing optical system and an optical integrator.

It is still another object of the present invention to provide a liquid crystal projector provided with an illumination optical system which has little likelihood of being degraded by heat from a light source despite the use of a polarization converting optical system and an optical integrator.

It is yet still another object of the present invention to provide a liquid crystal projector provided with an illumination optical system which has a simple construction and utilizes light at high efficiency.

According to one aspect of the present invention, a liquid crystal projector comprising: a liquid crystal panel; an illumination optical system for illuminating the liquid crystal panel, the illumination optical system including: a light source which emits a beam of light; a first lens array and a second lens array arranged in this order from the light source, the first and second lens arrays each having a plurality of lenses; and a polarization changing optical system arranged between the first and second lens arrays.

With this construction, since the polarization changing optical system is arranged between the first and second lens arrays constructing an optical integrator, it can be installed in a space for the optical integrator. Accordingly, there can be obtained the liquid crystal projector provided with the illumination optical system in which the polarization changing optical system and the optical integrator are installed in a smaller space.

According to another aspect of the present invention, a liquid crystal projector comprising: a liquid crystal panel; an illumination optical system for illuminating the liquid crystal panel, the illumination optical system including: a light source which emits a beam of light; a first lens array and a second lens array arranged in this order from the light source, the first and second lens arrays each having a plurality of lenses; and a polarization changing optical system arranged more toward the liquid crystal panel than the first lens array.

With this construction, since the polarization changing optical system is distanced from the light source by being arranged more toward the liquid crystal panel of the optical integrator, thus eliminating the likelihood that the polarization changing optical system is degraded by heat from the light source.

According to still another aspect of the present invention, a liquid crystal projector comprising: a liquid crystal panel; an illumination optical system for illuminating the liquid crystal panel, the illumination optical system including: a light source which emits a beam of light; a first lens array and a second lens array arranged in this order from the light source, the first and second lens arrays each having a plurality of lenses; a half-wave plate arranged in the vicinity of the second lens array; and a polarization changing optical system arranged more toward the light source than the second lens array.

With this construction, the polarization changing optical system is arranged more toward the light source than the second lens array. Accordingly, polarization change can be performed in a smaller space in the direction normal to the optical axis of the illumination optical system. The size of the illumination optical system can be reduced.

Further, the polarization changing optical system may be arranged more toward the liquid crystal panel than the first lens array. The second lens array may be preferably provided with twice as many lenses as the first lens array. The polarization changing optical system may be preferably provided with a polarized beam splitting surface and a full reflection surface. Further, the polarization changing optical system may be preferably made of a material having a property of birefringence.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
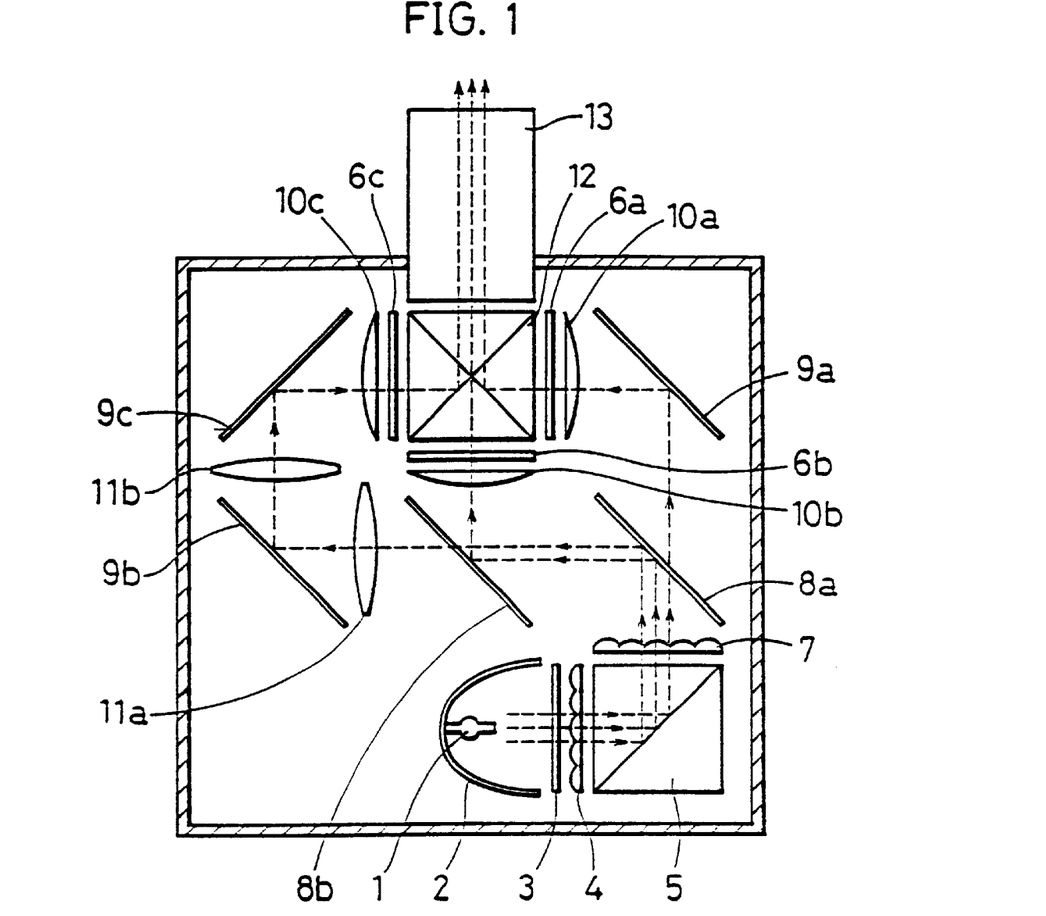
FIG. 1 is a diagram showing a construction of a first liquid crystal projector provided with an illumination optical system embodying the invention.

Embodiments of the invention are described with reference to the accompanying drawings. FIG. 1 is a construction diagram of a first embodiment of the invention, and FIGS. 2 to 5 are construction diagrams each showing an essential portion of an illumination optical system of each of first to fourth modifications of the first embodiment.

In FIG. 1, a beam of white randomly polarized light emitted from a metal halide lamp as a light source 1 is incident on a first lens array 4 constructing an optical integrator after being reflected by a reflector 2 and having unnecessary wavelength components thereof cut by an IR-UV cut filter 3. The beam from the light source 1 is split into a plurality of beams by the first lens array 4 and are incident on a polarized beam splitter 5, with the result that each split beam is split into two beams containing linearly polarized light components which are perpendicular to each other. Out of the beams split by the polarized beam splitter 5, those necessary for the illumination of liquid crystal panels 6a, 6b, 6c are introduced to a second lens array 7 constructing the optical integrator.

In this embodiment, the beams reflected by a polarized beam splitting surface of the polarized beam splitter 5 are beams containing polarized light components necessary for the illumination of the liquid crystal panels 6a, 6b, 6c. However, the beams containing polarized light components which transmit through the polarized beam splitter 5 may be used to illuminate the liquid crystal panels 6a, 6b, 6c if they are necessary for this purpose. Since the beams which reach the liquid crystal panels 6a, 6b, 6c do not contain unnecessary polarized light components, the excessive generation of heat caused by the unnecessary polarized light components at the liquid crystal panels can be prevented. As a result, the degradation of the liquid crystal panels can be prevented. Thus, as compared with a case where the beams containing unnecessary polarized light components reach the liquid crystal panels, the liquid crystal panels can be illuminated by a larger amount of beams containing necessary polarized light components, with the result that a brighter projected image can be obtained.

The light source 1 and the individual lenses of the second lens array 7 have an optically conjugate relationship: the image of the light source 1 is formed on the individual lenses of the second lens array 7 and the formed images act as a secondary light source. The beams introduced to the second lens array 7 are split into three wavelength bands of red (R), green (G) and blue (B) by dichroic mirrors 8a and 8b. The beams of the R wavelength band having transmitted through the dichroic mirror 8a illuminates the liquid crystal panel 6a after being reflected by a full reflection mirror 9a and transmitting through a field lens 10a. The beams of the G wavelength band having been reflected by the dichroic mirrors 8a and 8b illuminates the liquid crystal panel 6b after transmitting through a field lens 10b. The beams of the B wavelength band having been reflected by the dichroic mirror 8a and having transmitted through the dichroic mirror 8b illuminates the liquid crystal panel 6c after reflected by the full reflection mirrors 9b and 9c, having transmitted through the relay optical systems 11a and 11b and a field lens 10c.

Since the distance between the liquid crystal panel 6c and the second lens array 7 is different from the distance between the liquid crystal panel 6a, 6b and the second lens array 7, the relay optical systems 11a, 11b are used to illuminate the liquid crystal panel 6c in the same manner as the liquid crystal panels 6a, 6b are illuminated. The liquid crystal panels 6a, 6b, 6c are telecentrically illuminated by the field lenses 10a, 10b, 10c.

The individual lenses of the first lens array 4 and the liquid crystal panels 6a, 6b, 6c have an optically conjugate relationship. Since the respective beams split by the first lens array 4 are superimposed on the liquid crystal panels 6a, 6b, 6c, the liquid crystal panels 6a, 6b, 6c are illuminated at a uniform distribution of a light amount. Accordingly, the respective R-, G-, and B-images displayed on the liquid crystal panels 6a, 6b, 6c are combined by a dichroic prism 12 and are projected as a color image on a screen (not shown) at a uniform distribution of illuminance by a projection lens 13.

In this embodiment, in order to obtain a bright projected image having a uniform distribution of illuminance, the illumination optical system includes the polarized beam splitter and the optical integrator. Since the polarized beam splitter is arranged between the first and second lens array constructing the optical integrator in this embodiment, the illumination optical system requires only a small space by sharing a space between the polarized beam splitter and the optical integrator. This enables the realization of a very compact liquid crystal projector.

Although a metal halide lamp is used as the light source 1 in this embodiment, a xenon lamp or a halogen lamp may also be used.

Figure 2:
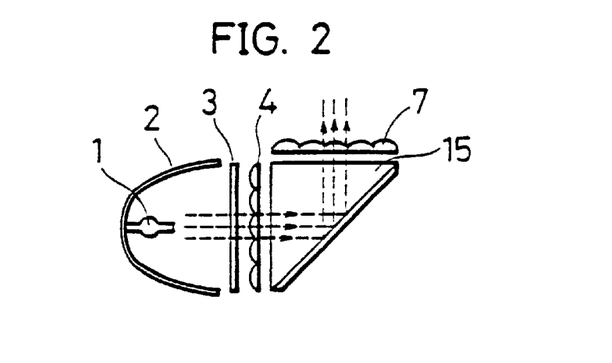
FIG. 2 is a diagram showing a construction of an essential portion of a first modified illumination optical system of the first projector.
Figure 3:
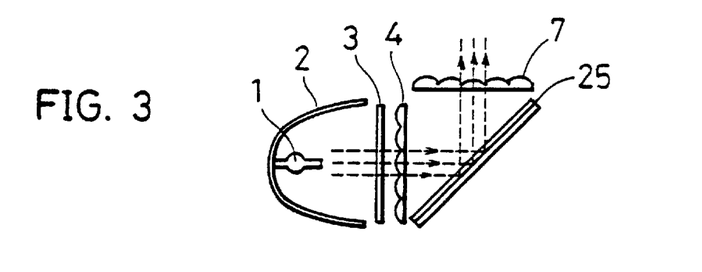
FIG. 3 is a diagram showing a construction of an essential portion of a second modified illumination optical system of the first projector.
Figure 4:
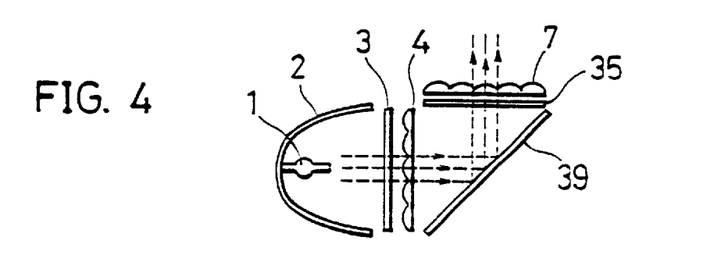
FIG. 4 is a diagram showing a construction of an essential portion of a third modified illumination optical system of the first projector.
Figure 5:
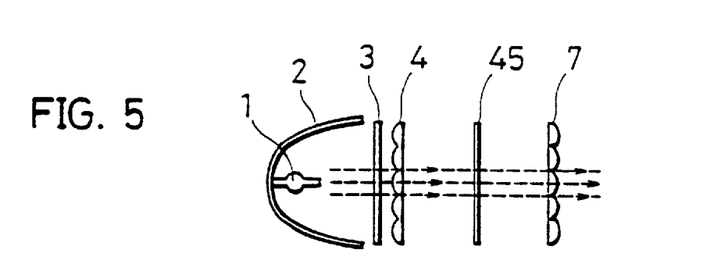
FIG. 5 is a diagram showing a construction of an essential portion of a fourth modified illumination optical system of the first projector.

Further, as shown in FIG. 2, it may be appreciated to use a polarized beam splitter 15 which is not provided with a prism through which the beams containing polarized light components necessary for the illumination of the liquid crystal panels do not transmit. Alternatively, a polarized beam splitter 25 may be used which is made of a flat plate as shown in FIG. 3. In such cases, the polarization changing optical system can be made more lightweight. Further, the same effects can be obtained by a construction in which a polarizer 35 and a full reflection mirror 39 are used as shown in FIG. 4 or only a polarizer 45 is used as shown in FIG. 5 in place of the polarized beam splitter in the polarization changing optical system.

Furthermore, FIGS. 6 to 10 each show an essential portion of an illumination optical system according to each of fifth to ninth modifications of the first embodiment.

Figure 6:
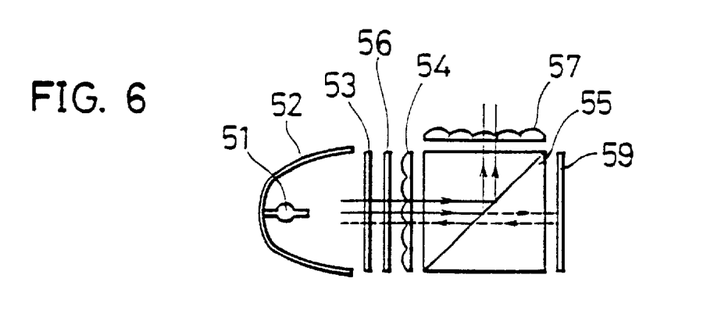
FIG. 6 is a diagram showing a construction of an essential portion of a fifth modified illumination optical system of the projector.

In FIG. 6, a beam of randomly polarized light emitted from a light source 51 is incident on a first lens array 54 constructing an optical integrator after being reflected by a reflector 52 and having unnecessary wavelength components thereof cut by an IR-UV cut filter 53. The beam from the light source 51 is split into a plurality of beams by the first lens array 54 which are incident on a polarized beam splitter 55, with the result that each split beam is split into two beams containing linearly polarized light components which are perpendicular to each other.

In this modification, out of the beams split by the polarized beam splitter 55, those necessary for the illumination of liquid crystal panels are introduced to a second lens array 57 constructing the optical integrator after being reflected by a polarized beam splitting surface of the polarized beam splitter 55. The beams containing polarized light components unnecessary for the illumination of the liquid crystal panels which have transmitted through the polarized beam splitting surface of the polarized beam splitter 55 are reflected by a full reflection mirror 59. The reflected beams are returned toward the light source 51, are again reflected by the reflector 52, and introduced to the polarized beam splitter 55.

In this modification, a quarter-wave plate 56 is arranged between the reflector 52 and the polarized beam splitter 55 so that beams containing polarized light components unnecessary for the illumination of the liquid crystal panels are converted into those containing polarized light components necessary for the illumination of the liquid panels. Thus, the beams introduced to the polarized beam splitter 55 are reflected by the polarized beam splitting surface and introduced to the second lens array 57 to illuminate the liquid crystal panels. Therefore, energy from the light source 51 can be effectively utilized to obtain a brighter projected image.

Figure 7:
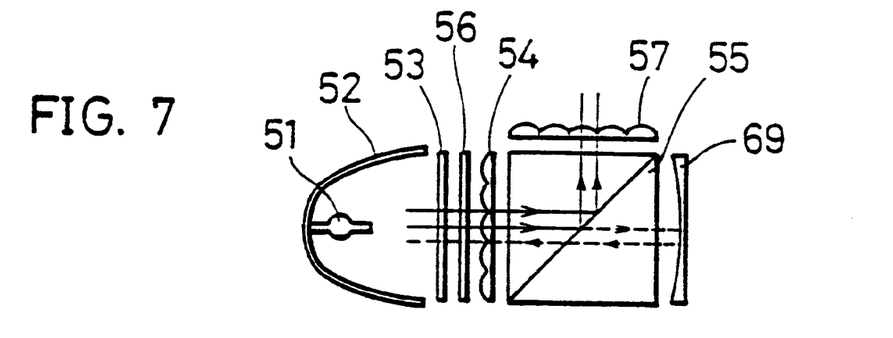
FIG. 7 is a diagram showing a construction of an essential portion a sixth modified illumination optical system of the first projector.

Further, since the beams containing polarized light components unnecessary for the illumination of the liquid crystal panels are returned back to the light source 51, they do not become a stray light in the liquid crystal projector which causes a ghost and/or a flare. Further, instead of the full reflection mirror 59 in the fifth modification of FIG. 6, a full reflection concave mirror 69 may be provided as shown in FIG. 7 so as to converge and return the beams containing polarized light components unnecessary for the illumination of the liquid crystal panels to a position in proximity to the light source. Then, since these beams are returned toward the polarized beam splitter substantially along the same optical path as the light originally emitted from the light source, the light from the light source can be more efficiently utilized.

Figure 8:
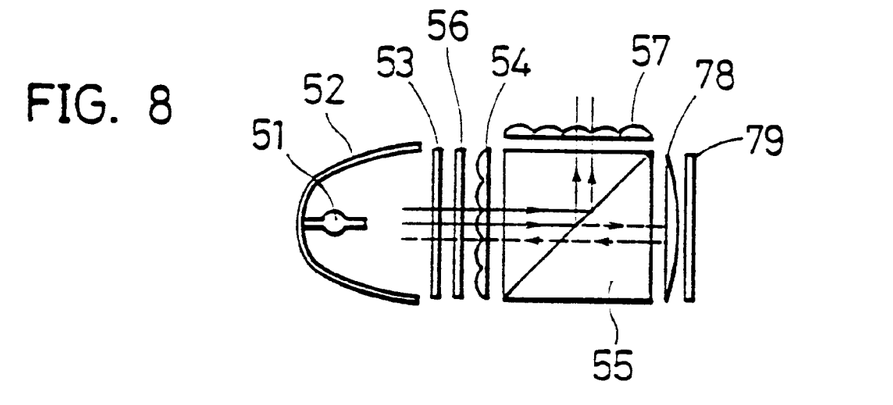
FIG. 8 is a diagram showing a construction of an essential portion of a seventh modified illumination optical system of the first projector.
Figure 9:
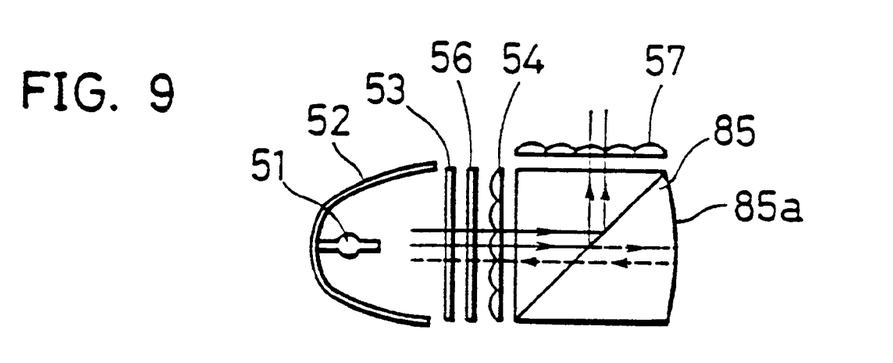
FIG. 9 is a diagram showing a construction of an essential portion of a eighth modified illumination optical system of the first projector.
Figure 10:
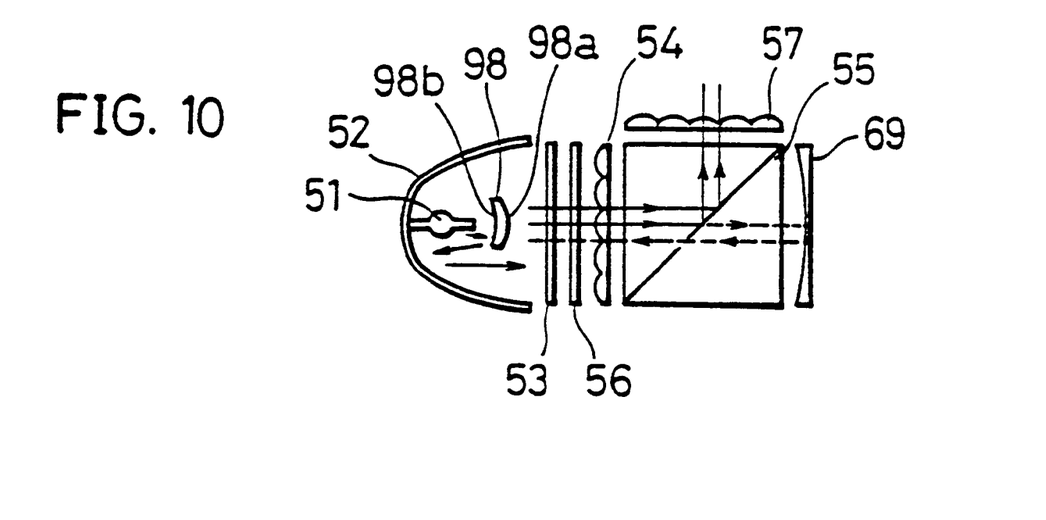
FIG. 10 is a diagram showing a construction of an essential portion of a ninth modified illumination optical system of the first projector.

The same effects can be obtained by employing, instead of the full reflection concave mirror 69, a combination of a convex lens 78 and a full reflection mirror 79 as shown in FIG. 8 or a polarized beam splitter 85 in which a convex lens and a reflection surface 85a are unitarily formed as shown in FIG. 9. In the case that the polarized beam splitter 85 is used, the number of parts can be reduced. Further, as shown in FIG. 10, the beams returned by the reflection concave mirror 69 may be returned toward the polarized beam splitter not by the reflector 52, but by a reflection surface 98a of a reflection member 98. Further, by returning waste beams which have emitted from the light source, but have not reached the reflector 52 by means of a reflection surface 98b of the reflection member 98, the light from the light source can be further effectively utilized.

Figure 11:
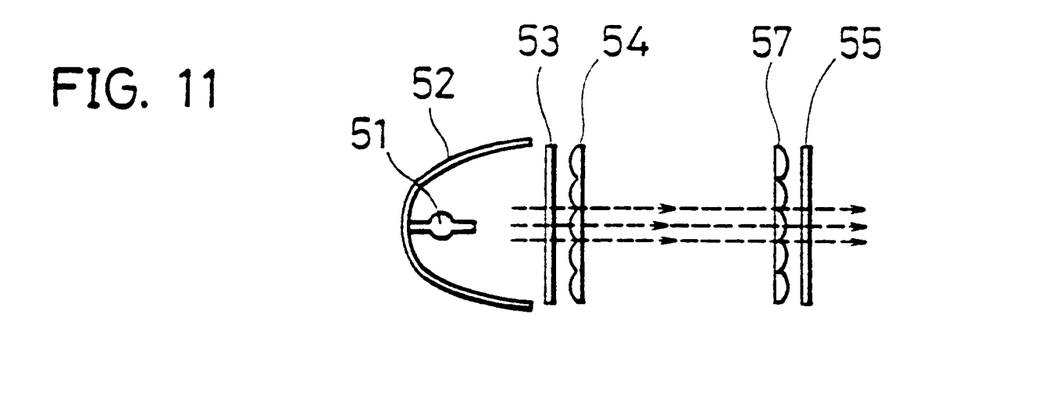
FIG. 11 is a diagram showing a construction of an essential portion of a tenth modified illumination optical system of the first projector.

FIG. 11 is a construction diagram of an essential portion of an illumination optical system according to a tenth modification of the first embodiment.

In FIG. 11, a beam of white randomly polarized light emitted from the light source 51 is incident on the first lens array 54 constituting an optical integrator after being reflected by the reflector 52 and having unnecessary wavelength components thereof cut by the IR-UV cut filter 53. The beam from the light source 51 is split into a plurality of beams by the first lens array 54 which are incident on corresponding lenses of the second lens array 57. The beams incident on the second lens array 57 illuminate liquid crystal panels via a polarizer 55 as a polarization changing optical system. Only the beams containing polarized light components necessary for the illumination of the liquid crystal panels transmit through the polarizer 55.

Accordingly, excessive generation of heat by the beams containing polarized light components unnecessary for the illumination of the liquid crystal panels can be prevented, thereby preventing the degradation of the liquid crystal panels, and the like. Thus, as compared with a case where the beams containing unnecessary polarized light components reach the liquid crystal panels, the liquid crystal panels can be illuminated by a larger amount of beams containing necessary polarized light components, with the result that a brighter projected image can be obtained. Further, since the polarizer 55 is arranged at the side of the optical integrator toward the liquid crystal panels, it can be distanced from the light source, making the polarizer 55 less subject to the heat of the light source. Here, a polarized beam splitter may be used instead of the polarizer.

As described above, since the polarization changing optical system is arranged between the first and second lens arrays which construct the optical integrator, it can be installed in a space for the optical integrator. Accordingly, there can be obtained the liquid crystal projector provided with the illumination optical system in which the polarization changing optical system and the optical integrator are installed in a small space. Thus, there can be obtained a very compact liquid crystal projector capable of projecting a bright image having a uniform distribution of illuminance.

Further, by distancing the polarization changing optical system from the light source by arranging it at the side of the optical integrator toward the liquid crystal panels, the degradation of the polarization changing optical system caused by the heat of the light source can be reduced. As a result, liquid crystal projectors of stable quality and of small size can be obtained.

Figure 12:
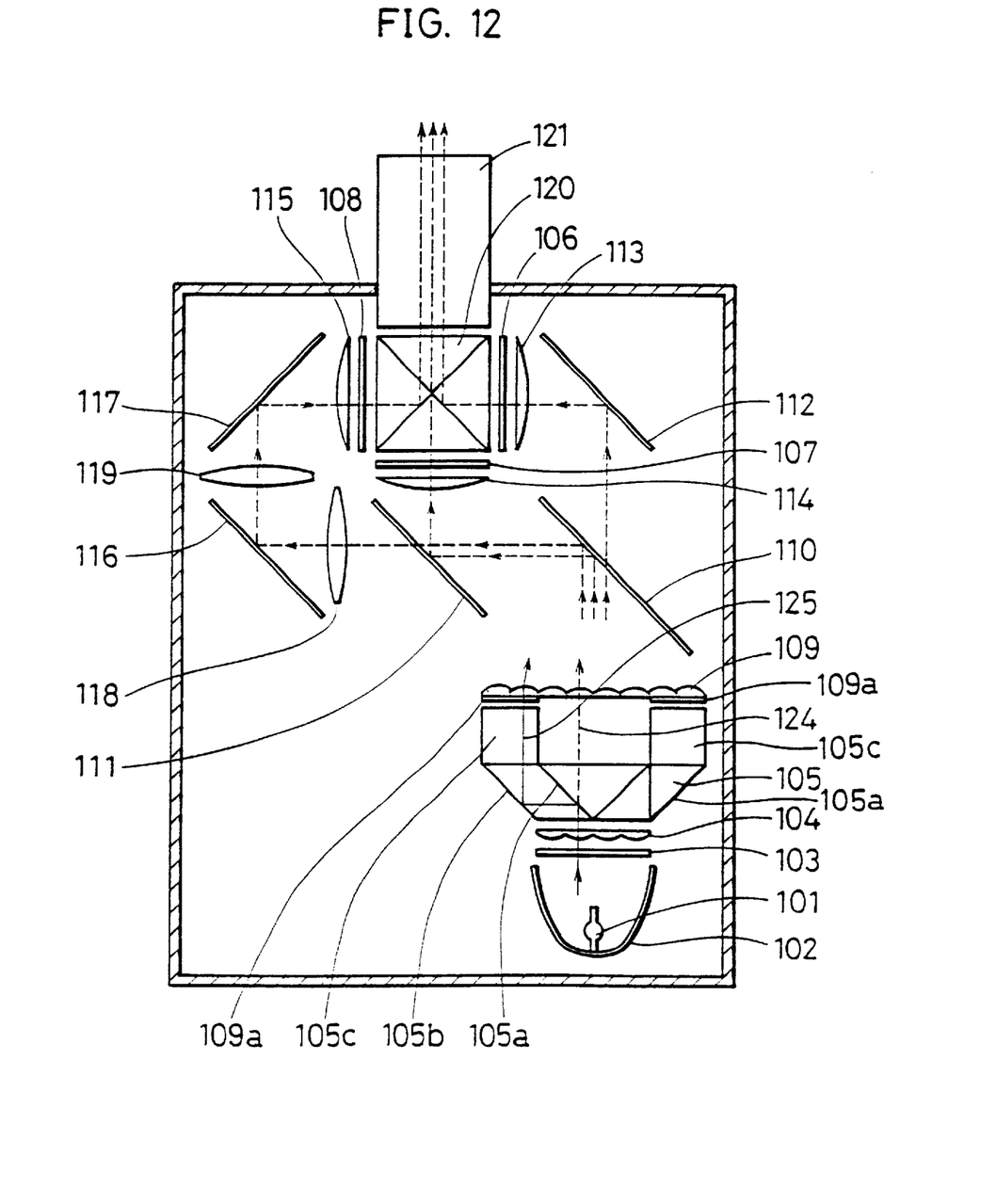
FIG. 12 is a diagram showing a construction of a second liquid crystal projector provided with an illumination optical system embodying the invention.

FIG. 12 is a construction diagram of a second embodiment of the invention. In FIG. 12, a beam of white randomly polarized light emitted from a light source 101 is incident on a first lens array 104 constructing an optical integrator after being reflected by a reflector 102 and having unnecessary wavelength components thereof cut by an IR-UV cut filter 103. The beam from the light source 101 is split into a plurality of beams by the first lens array 104 which are incident on a polarized beam splitter 105 and are split, by a polarized beam splitting surface 105a, into two beams 124, 125 containing linearly polarized light components which are perpendicular to each other. Out of these beams 124, 125, the beam 124 having transmitted through the surface 105a is introduced to a second lens array 109 constructing the optical integrator after coming out of the polarized beam splitter 105.

On the other hand, the beams 125 reflected by the polarized beam splitting surface 105a come out of the polarized beam splitter 105 to be introduced to the second lens array 109 after being fully reflected by a full reflection surface 105b. In positions of the polarized beam splitter 105 where the beams 125 reflected by the splitting surfaces 105a transmit after being fully reflected by the full reflection surfaces 105b, glass members 105c are joined so as to correct a difference between the optical paths of the beams 124 transmitting through the splitting surfaces 105a and the beams 125 reflected by the splitting surfaces 105a. The beams 124 and 125 form, in the vicinity of the second lens array 109, as many small light sources as the split beams by the first lens array 104 by the focusing action of the first lens array 104.

The second lens array 109 includes twice as many lenses as the small light sources formed by the beams 124, 125, i.e., twice the number of the lenses included in the first lens array 104, and the respective lenses of the second lens array 109 correspond to the respective small light sources. By arranging half-wave plates 109a at the lenses corresponding to the small light sources formed on the second lens array 109 by either the beams 124 or the beams 125, the polarization directions of all small light sources can be aligned.

In FIG. 12, the half-wave plates 109a are arranged at the small light sources formed by the beams 125. In this embodiment, all beams emitted from the small light sources formed on the second lens array 109 and having their polarization directions aligned are necessary for the illumination of liquid crystal panels 106 to 108. Since the beams which reach the liquid crystal panels 106 to 108 do not contain unnecessary polarized light components, excessive generation of heat caused by absorption of beams containing unnecessary polarized light components by polarizers at the liquid crystal panels can be prevented. As a result, the degradation of the polarizers can be prevented.

As compared with a case where the beams containing unnecessary polarized light components reach the liquid crystal panels, the liquid crystal panels can be illuminated by a larger amount of beams containing necessary polarized light components, with the result that a brighter projected image can be obtained. The light source 101 and the individual lenses of the second lens array 109 have an optically conjugate relationship: the image of the light source 101 is formed on the individual lenses of the second lens array 101, and the thus formed images act as a secondary light source. Each beam introduced to the second lens array 109 is split into three wavelength bands of R, G, and B by dichroic mirrors 110, 111. The beams of R wavelength band having transmitted through the dichroic mirror 110 illuminate the liquid crystal panel 106 after being reflected by a full reflection mirror 112 and transmitting through a field lens 113. The beams of G wavelength band having being reflected by the dichroic mirrors 110 and 111 illuminate the liquid crystal panel 107 after transmitting through a field lens 114. The beams of B wavelength band having being reflected by the dichroic mirror 110 and having transmitted through the dichroic mirror 111 illuminate the liquid crystal panel 108 after transmitting through a field lens 115 via full reflection mirrors 116, 117 and relay optical systems 118, 119. Since a distance between the liquid crystal panel 108 and the second lens array 109 differs from a distance between the liquid crystal panels 106, 107 and the second lens array 109, the relay optical systems 118, 119 are used to illuminate the liquid crystal panel 108 in the same manner as the liquid crystal panels 106, 107 are illuminated.

The liquid crystal panels 106 to 108 are telecentrically illuminated by the field lenses 113 to 115. Here, the individual lenses of the first lens array 104 and the liquid crystal panels 106 to 108 have an optically conjugate relationship. In other words, the liquid crystal panels 106 to 108 are illuminated at a uniform distribution of illuminance since the beams split by the first lens array 104 are superimposed on the lenses and the liquid crystal panels 106 to 108. Thus, the images of R, G, B displayed on the liquid crystal panels 106 to 108 are combined by a dichroic prism 120 and projected as a color image at a uniform distribution of illuminance on a screen (not shown) by a projection lens 121.

In this embodiment, by arranging the half-wave plates in the vicinity of the second lens array constructing the optical integrator and arranging the polarization changing optical system between the first and second lens arrays, the beam from the light source can be very effectively utilized to illuminate the liquid crystal panels, and the polarization changing optical system and the optical integrator can be installed in a common space. Thus, there can be obtained a very compact liquid crystal projector which is capable of projecting a bright image having a uniform distribution of illuminance and whose illumination optical system is reduced in size along its main optical axis. Although a metal halide lamp is used as the light source 101 in this embodiment, a xenon lamp or a halogen lamp may also be used.

Figure 13:
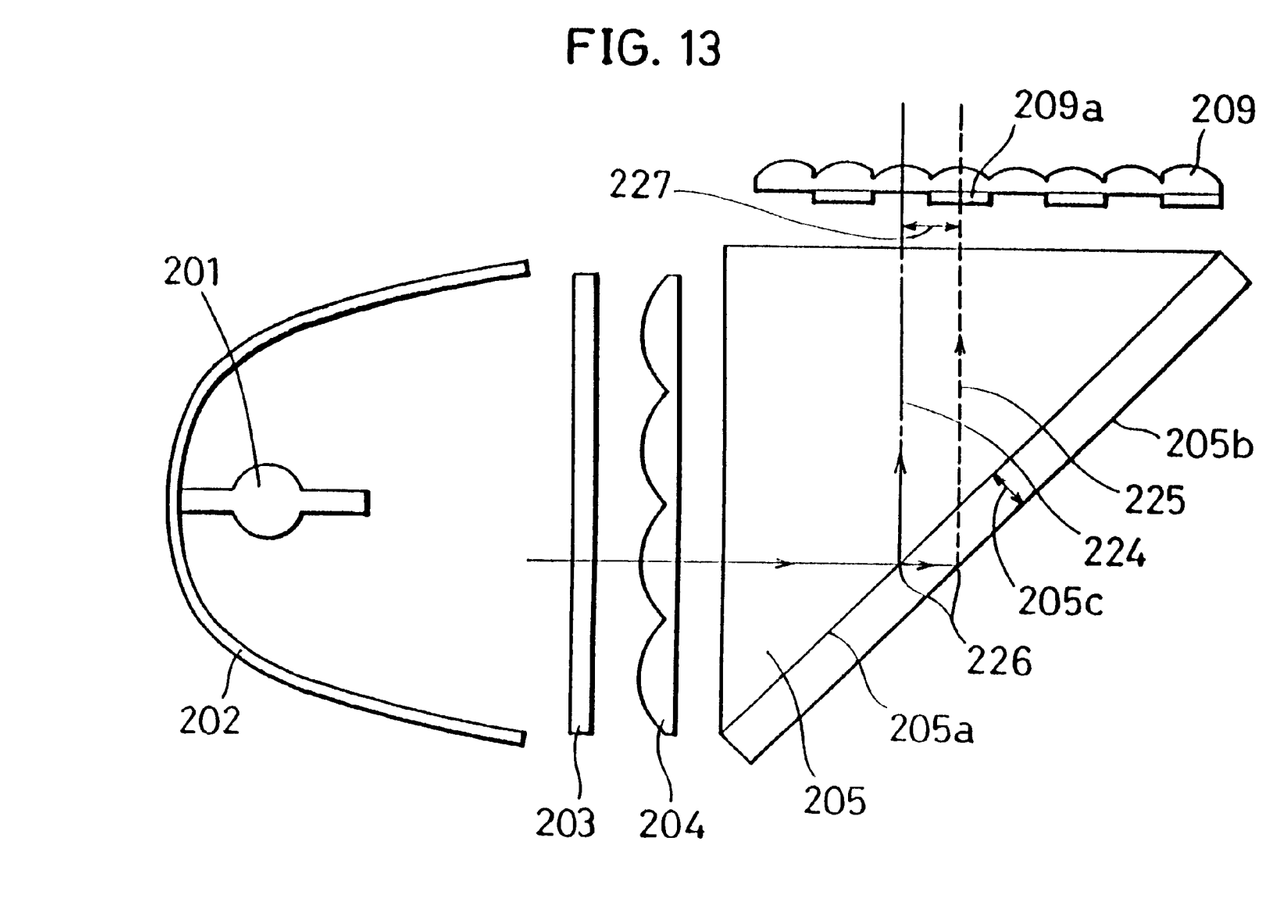
FIG. 13 is a diagram showing a construction of an essential portion of a first modified illumination optical system of these second projector.
Figure 14:
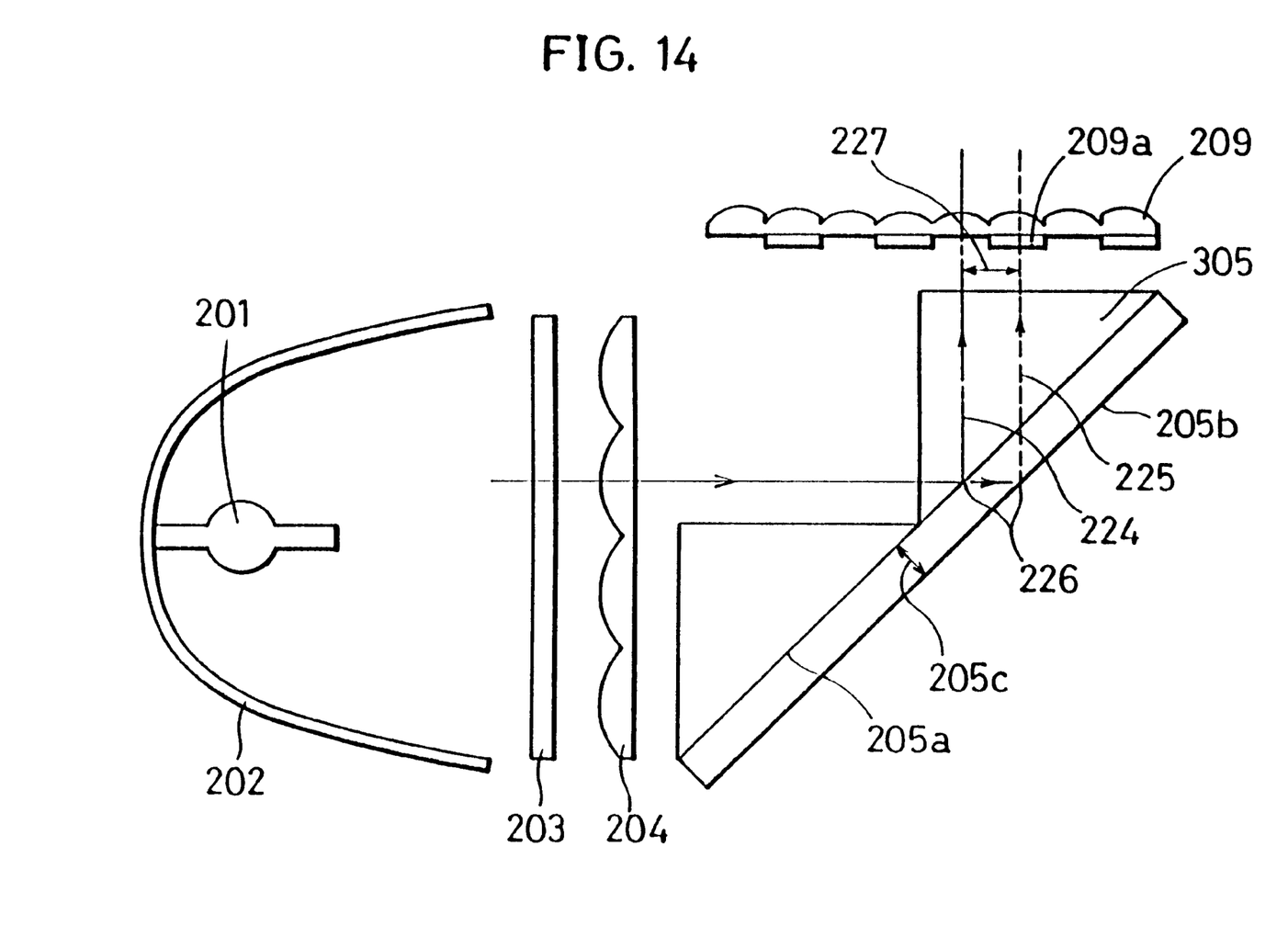
FIG. 14 is a diagram showing a construction of an essential portion of a second modified illumination optical system of the second projector.

FIGS. 13 and 14 are construction diagrams each showing an illumination optical system of each of first and second modifications of the second embodiment.

In FIG. 13, a beam of white randomly polarized light emitted from a light source 201 is incident on a first lens array 204 constructing an optical integrator after being reflected by a reflector 202 and having unnecessary wavelength components thereof cut by an IR-UV cut filter 203. The beam from the light source 201 is split into a plurality of beams by the first lens array 204 which are incident on a polarized beam splitter 205, and are split, by a polarized beam splitting surface 205a, into two beams 224, 225 containing linearly polarized light components which are perpendicular to each other. Out of these beams 224, 225, the beam 224 having being reflected by the splitting surface 205a is introduced to a first lens array 209 constructing the optical integrator after coming out of the polarized beam splitter 205.

On the other hand, the beams 225 having transmitted through the splitting surface 205a are fully reflected by a full reflection surface 205b after propagating straight along an optical path 226 formed by a clearance 205c between the splitting surface 205a and the full reflection surface 205b. Thereafter, the beams 225 are introduced to the second lens array 209 after coming out of the polarized beam splitter 205. The beams 224 having transmitted through the splitting surface 205a and the beams 125 having been reflected by the splitting surface 205a form, in the vicinity of the second lens array 209, as many small light sources as the split beams by the first lens array 204 by the focusing action of the first lens array 204. At this time, the small light source formed by the beam 225 is shifted from the corresponding light source formed by beams 224 by a lateral displacement 227 which is equal to the length of the optical path 226 along which the beam 225 propagates straight in the clearance 205c between the splitting surface 205a and the full reflection surface 205b.

The clearance 205c between the splitting surface 205a and the full reflection surface 205b is set such that the lateral displacement 227 is half the spacing between individual small light sources formed by the beams 224 reflected by the splitting surface 205a. Thus, in the vicinity of the second lens array 209, the individual small light sources formed by the beams 224 reflected by the splitting surface 205a and those formed by the beams 225 reflected by the full reflection surface 205b are alternately formed along a direction parallel to the direction of the lateral displacement 227. The total number of the small light sources is twice the number of the beams split by the first lens array 204. If the small light sources formed by the beams 224 and those formed by the beams 225 are collectively considered as a secondary light source (not shown) including a plurality of light sources without being distinguished from each other, an area taken up by the secondary light source on the second lens array 209 is substantially equal to an area taken up by the individual small light sources formed by the beams 224 on the second lens array 209. The second lens array 209 includes as many lenses as the small light sources included in the secondary light source, i.e., twice as many lenses as the first lens array 204, and the lenses of the second lens array 209 respectively correspond to the small light sources.

Here, the individual lenses of the first lens array 204 and the liquid crystal panels have an optically conjugate relationship. Since the beams split by the first lens array 204 are superimposed on the liquid crystal panels, the liquid crystal panels are illuminated at a uniform distribution of illuminance. If the second lens array 209 includes as many lenses as the first lens array 204, the beams split by the first lens array 204 can be only insufficiently superimposed on the liquid crystal panels. By setting the number of lenses of the second lens array 209 twice the number of the lenses of the first lens array 204, the beams split by the first lens array 204 can be efficiently and correctly superimposed on the liquid crystal panels.

By arranging half-wave plates 209a at the lenses corresponding to the small light sources formed on the second lens array 209 by either the beams 224 or the beams 225, the polarization direction of the small light sources provided with the half-wave plates 209a is changed into that of the small light sources not provided with the half-wave plates 209, thereby aligning the polarization direction of all small light sources. Accordingly, the beams emitted from all small light sources can be very efficiently used to illuminate the liquid crystal panels.

Although the half-wave plates 209a are arranged at the small light sources formed by the beams 225 in the modification shown in FIG. 13, they may be arranged at either the small light sources formed by the beams 224 or those formed by the beams 225. However, the arrangement of the half-wave plates 209a at the small light sources formed by the beams 225 is preferable because of an effect of correcting a difference between the optical paths of the beams 224 having transmitted through the splitting surface 205a and those of the beams 225 having been reflected by the splitting surface 205a. Further, by the action of the optical integrator, the liquid crystal panels can be illuminated at a uniform distribution of illuminance.

Further, by constructing the polarization changing optical system by the polarized beam splitting surface and the full reflection surface, there is realized an easily manufacturable, inexpensive and compact illumination optical system. By arranging the half-wave plates in the vicinity of the second lens array constructing the optical integrator and arranging the polarization changing optical system between the first and second lens arrays, the polarization changing optical system and the optical integrator can be installed in a common space; the area taken up by the secondary light source can be reduced; and the beam from the light source can be very efficiently used for the illumination of the liquid crystal panels. As a result, a bright projected image having a uniform distribution of illuminance can be obtained, and a compact liquid crystal projector can be realized which includes an illumination optical system having a reduced dimension along a direction normal to its main optical axis.

The polarization changing optical system can be made more lightweight if a polarized beam splitter 305 is constructed by a plurality of right-angle prisms as shown in a second modification of FIG. 14. The right-angle prism preferably has a side of about 40 mm because such a prism is easy to process. If the polarization changing optical system needs to be more lightweight, smaller right-angle prisms may be used.

Figure 15:
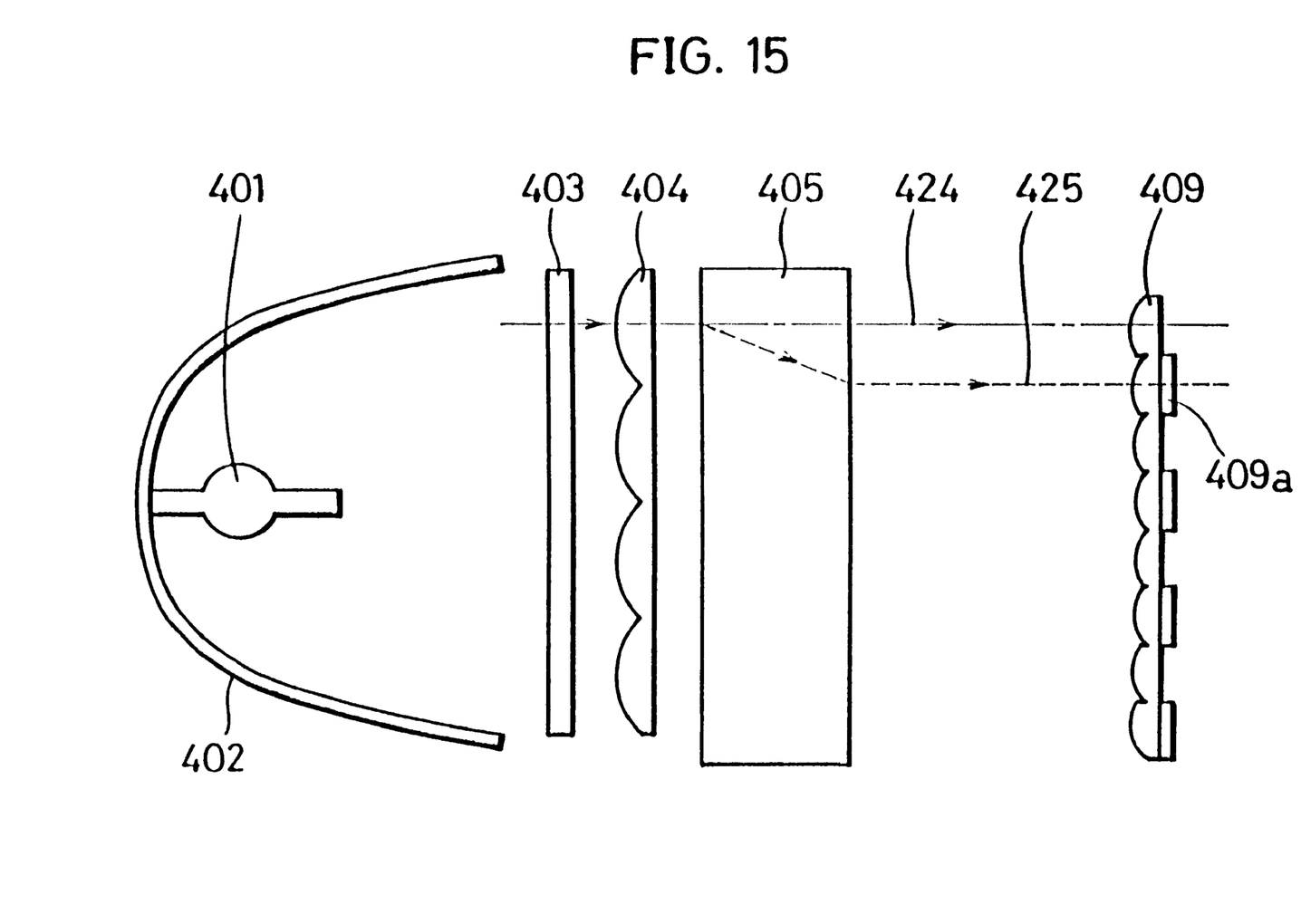
FIG. 15 is a diagram showing a construction of an essential portion of a third modified illumination optical system of the second projector.

FIG. 15 is a construction diagram of an essential portion of an illumination optical system according to a third modification of the second embodiment.

In FIG. 15, a beam of white randomly polarized light emitted from a light source 401 is incident on a first lens array 404 constructing an optical integrator after being reflected by a reflector 402 and having unnecessary wavelength components thereof cut by an IR-UV cut filter 403. The beam from the light source 401 is split into a plurality of beams by the first lens array 404 which are then incident on a calcite plate 405. Each split beam is split into two beams 424, 425 having linearly polarized light components perpendicular to each other by the birefringent action of the calcite plate 405. In the vicinity of the second lens array 409, the split beams 424, 425 form as many small light sources as the beams split by the first lens array 404 by the focusing action of the first lens array 404.

The second lens array 409 includes as many lenses as the small light sources formed by the beams 424, 425, i.e., twice the number of the lenses includes in the first lens array 404. The individual lenses of the second lens array 409 correspond to the respective small light sources. Half-wave plates 409a are arranged on the lenses of the second lens array 409 corresponding to the small light sources formed by the beams 425, so that the polarization direction of the small light sources formed by the beams 425 is changed into that of the small light sources formed by the beams 424. Accordingly, the polarization direction of all small light sources is aligned in a direction necessary for the illumination of the liquid crystal panels, with the result that the beam from the light source 401 can be very efficiently utilized to illuminate the liquid crystal panels. Further, by the action of the optical integrator, the liquid crystal panels can be illuminated at a uniform amount of light.

Further, by using the calcite having a birefringent action, there can be realized a compact illumination optical system having a very small number of parts and a simple construction. By arranging the half-wave plates in the vicinity of the second lens array constructing the optical integrator and arranging the polarization changing optical system between the first and second lens array using the calcite having a birefringent action, there can be realized an illumination optical system having a small and simple construction and also a compact liquid crystal projector capable of obtaining a bright projected image having a uniform distribution of illuminance. Although calcite is used as a birefringent material in this modification, KDP, ADP, liquid crystal, polycarbonate caused to have a birefringent action by applying an internal stress, or like birefringent material may be used.

Figure 16:
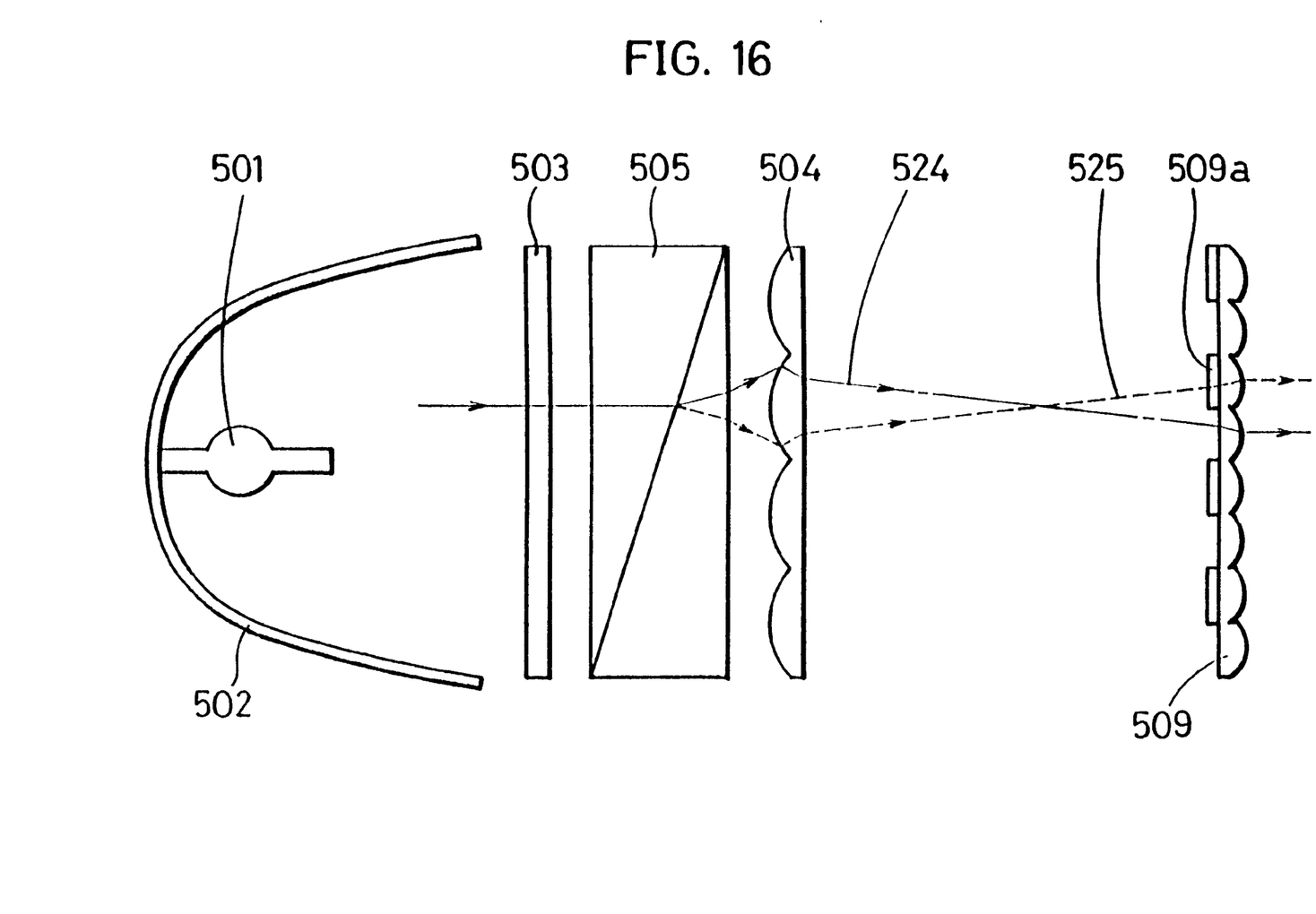
FIG. 16 is a diagram showing a construction of an essential portion of a fourth modified illumination optical system of the second projector.

FIG. 16 is a construction diagram of an illumination optical system according to a fourth modification of the second embodiment.

In FIG. 16, a beam of white randomly polarized light emitted from a light source 501 is incident on a Wollaston prism 505 made of calcite having a birefringent action after being reflected by a reflector 502 and having unnecessary wavelength components thereof cut by an IR-UV cut filter 503. The randomly polarized beam incident on the Wollaston prism 505 is split into two beams having linearly polarized light components which propagate in directions different from each other and are perpendicular to each other. The split beams are incident on a first lens array 504 constructing an optical integrator. The beam from the light source is split by the first lens array 504 into as many beams as the lenses included in the first lens array 504. The thus split beams are focused in the vicinity of a second lens array 509 constructing the optical integrator, thereby forming small light sources.

Since the two beams having linearly polarized light components perpendicular to each other are incident on the first lens array 504 at different angles of incidence, they become beams 524, 525 which are focused in different positions in the vicinity of the second lens array 509. Accordingly, in the vicinity of the second lens array 509, there are formed small light sources which are twice the number of the lenses included in the first lens array 504. The lenses of the second lens array 509 are so formed as to correspond to the respective small light sources. Half-wave plates 509a are arranged on the lenses of the second lens array 509 corresponding to the small light sources formed by the beams 525, so that the polarization direction of the small light sources formed by the beams 525 is changed into that of the small light sources formed by the beams 524. Accordingly, the polarization direction of all small light sources is aligned in a direction necessary for the illumination of the liquid crystal panels, with the result that the beam from the light source 501 can be very efficiently utilized to illuminate the liquid crystal panels.

By arranging the half-wave plates in the vicinity of the second lens array constructing the optical integrator and arranging the Wollaston prism at the side of the first lens array toward the light source, there can be realized an illumination optical system having a simple construction and a reduced dimension along a direction normal to its main optical axis, and also a compact liquid crystal projector capable of obtaining a bright projected image having a uniform distribution of illuminance.

The same effects as above can be obtained even if the Wollaston prism is arranged at the side of the first lens array toward the liquid crystal panels. Although calcite is used as a birefringent material of the Wollaston prism in this modification, KDP, ADP, liquid crystal, polycarbonate caused to have a birefringent action by applying an internal stress, or like birefringent material may be used. Further, instead of the Wollaston prism, a Rochon prism made of a birefringent material may be used.

As described above, by arranging the half-wave plates in the vicinity of the second lens array of the optical integrator and arranging the polarization changing optical system more toward the light source than the second lens array, polarization change can be performed in a smaller space in the direction normal to the optical axis of the illumination optical system, taking advantage of the focusing action of the first lens array. This assures production of a smaller liquid crystal projector.

Further, by arranging the polarization changing optical system at the side of the first lens array toward the liquid crystal panels, the polarization changing optical system and the optical integrator can be installed in a common space. Accordingly, the illumination optical system can be reduced in size along its main optical axis.

Furthermore, by setting the number of the lenses included in the second lens array twice the number of the lenses included in the first lens array and arranging the half-wave plates at the half of the lenses of the second lens array, the images of the individual lenses included in the first lens array after the polarization change can be correctly focused on the liquid crystal panels. Therefore, a bright and uniform projected image can be highly efficiently obtained.

Further, by performing a polarization change using a difference between the optical paths of the beams reflected by the polarized beam splitting surface and the full reflection surface, the polarization changing optical system can be easily manufactured and can also be made compact.

Furthermore, the use of a birefringent material leads to the size-reduction and simple construction of the polarization changing optical system.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:
1. A liquid crystal projector comprising:
a liquid crystal panel;
an illumination optical system for illuminating the liquid crystal panel, the illumination optical system including:
a light source which emits a beam of light;
a first lens array and a second lens array arranged in this order from the light source, the first and second lens arrays each having a plurality of lenses; and a polarization changing optical system, arranged between the first and second lens arrays, for separating light having a predetermined polarization component from incident light.

2. A liquid crystal projector as defined in claim 1, wherein the second lens array includes twice as many lenses as the first lens array.

3. A liquid crystal projector as defined in claim 1, wherein the polarization changing optical system includes a polarized beam splitting surface and a full reflection surface.

4. A liquid crystal projector as defined in claim 3, wherein the polarized beam splitting surface is disposed adjacent to the full reflection surface.

5. A liquid crystal projector comprising:
  a liquid crystal panel;
  an illumination optical system for illuminating the liquid crystal panel, the illumination optical system including:
    a light source which emits a beam of light;
    a first lens array and a second lens array arranged in this order from the light source, the first and second lens arrays each having a plurality of lenses; and
    a polarization changing optical system, arranged more toward the liquid crystal panel than the first lens array, for separating light having a predetermined polarization component from incident light.

6. A liquid crystal projector as defined in claim 5, wherein the second lens array includes twice as many lenses as the first lens array.

7. A liquid crystal projector as defined in claim 5, wherein the polarization changing optical system includes a polarized beam splitting surface and a full reflection surface.

8. A liquid crystal projector as defined in claim 7, wherein the polarized beam splitting surface is disposed adjacent to the full reflection surface.

9. A liquid crystal projector comprising:
  a liquid crystal panel;
  an illumination optical system for illuminating the liquid crystal panel, the illumination optical system including:
    a light source which emits a beam of light;
    a first lens array and a second lens array arranged in this order from the light source, the first and second lens arrays each having a plurality of lenses;
    a polarization changing optical system, arranged more toward the light source than the second lens array, for separating a first light having a first polarization component and a second light having a second polarization component; and
    a half-wave plate, arranged in the vicinity of the second lens array, for changing the polarization of the second light to the first polarization.

10. A liquid crystal projector as defined in claim 9, wherein the polarization changing optical system is arranged more toward the liquid crystal panel than the first lens array.

11. A liquid crystal projector as defined in claim 9, wherein the second lens array includes twice as many lenses as the first lens array.

12. A liquid crystal projector as defined in claim 9, wherein the polarization changing optical system includes a polarized beam splitting surface and a full reflection surface.

13. A liquid crystal projector as defined in claim 12, wherein the polarized beam splitting surface is disposed adjacent to the full reflection surface.

14. A liquid crystal projector as defined in claim 9, wherein the polarization changing optical system is made of a material having a property of birefringence.

15. A liquid crystal projector comprising:
  a liquid crystal panel;
  an illumination optical system for illuminating the liquid crystal panel, the illumination optical system including:
    a light source which emits light;
    a first lens array and a second lens array arranged in this order from the light source, the first and second lens arrays each having a plurality of lenses, wherein luminous flux divided by the first lens array are superimposed on said liquid crystal panel by the second lens array so as to improve uniformity of illuminance of said liquid crystal panel; and
    a polarization changing optical system arranged between the first and second lens arrays.

16. A liquid crystal projector as defined in claim 15, wherein the second lens array includes twice as many lenses as the first lens array.

17. A liquid crystal projector as defined in claim 15, wherein the polarization changing optical system includes a polarized beam splitting surface and a full reflection surface.

18. A liquid crystal projector as defined in claim 17, wherein the polarized beam splitting surface is disposed adjacent to the full reflection surface.

19. A liquid crystal projector comprising:
  a liquid crystal panel;
  an illumination optical system for illuminating the liquid crystal panel, the illumination optical system including:
    a light source which emits light;
    a first lens array and a second lens array arranged in this order from the light source, the first and second lens arrays each having a plurality of lenses, wherein luminous flux divided by the first lens array are superimposed on said liquid crystal panel by the second lens array so as to improve uniformity of illuminance of said liquid crystal panel; and
    a polarization changing optical system arranged more toward the liquid crystal panel than the first lens array.

20. A liquid crystal projector as defined in claim 19, wherein the second lens array includes twice as many lenses as the first lens array.

21. A liquid crystal projector as defined in claim 19, wherein the polarization changing optical system includes a polarized beam splitting surface and a full reflection surface.

22. A liquid crystal projector as defined in claims 21, wherein the polarized beam splitting surface is disposed adjacent to the full reflection surface.

23. A liquid crystal projector comprising:
  a liquid crystal panel;
  an illumination optical system for illuminating the liquid crystal panel, the illumination optical system including:
    a light source which emits light;
    a first lens array and a second lens array arranged in this order from the light source, the first and second lens arrays each having a plurality of lenses, wherein luminous flux divided by the first lens array are superimposed on said liquid crystal panel by the second lens array so as to improve uniformity of illuminance of said liquid crystal panel;
    a half-wave plate arranged in the vicinity of the second lens array; and a polarization changing optical system, arranged more toward the light source than the second lens array.

24. A liquid crystal projector as defined in claim 23, wherein the polarization changing optical system is arranged more toward the liquid crystal panel than the first lens array.

25. A liquid crystal projector as defined in claim 23, wherein the second lens array includes twice as many lenses as the first lens array.

26. A liquid crystal projector as defined in claim 23, wherein the polarization changing optical system includes a polarized beam splitting surface and a full reflection surface.

27. A liquid crystal projector as defined in claim 26, wherein the polarized beam splitting surface is disposed adjacent to the full reflection surface.

28. A liquid crystal projector as defined in claim 23, wherein the polarization changing optical system is made of a material having a property of birefringence.

29. A liquid crystal projector comprising:

a liquid crystal panel;

an illumination optical system for illuminating the liquid crystal panel, the illumination optical system including:
    a light source which emits a beam of light;
    a first lens array and a second lens array arranged in this order from the light source, the first and second lens arrays each having a plurality of lenses; and
    a polarization changing optical system, arranged at a position in the illumination optical system selected from the group of (1) between the first and second lens arrays, (2) arranged more toward the liquid crystal panel than the first lens array, and (3) arranged more toward the light source than the second lens array, said polarization changing optical system for separating light having a predetermined polarization component from incident light.

* * * * *